United States Patent [19]

Wickramasinghe

[11] Patent Number: 5,384,639
[45] Date of Patent: Jan. 24, 1995

[54] DEPTH MEASUREMENT OF HIGH ASPECT RATIO STRUCTURES

[75] Inventor: Hemantha K. Wickramasinghe, Chappaqua, N.Y.

[73] Assignee: International Business Machines Corporation, Armonk, N.Y.

[21] Appl. No.: 63,109

[22] Filed: May 17, 1993

Related U.S. Application Data

[63] Continuation-in-part of Ser. No. 882,386, May 13, 1992, abandoned.

[51] Int. Cl.$^6$ ............................................. G01B 11/22
[52] U.S. Cl. ..................................... 356/355; 356/357
[58] Field of Search ............... 356/378, 381, 382, 372, 356/355, 357

[56] References Cited

U.S. PATENT DOCUMENTS

| | | | |
|---|---|---|---|
| 3,808,878 | 5/1974 | Dini | 731/620 |
| 3,873,211 | 3/1975 | Watson | 356/378 |
| 4,155,098 | 5/1979 | Roach et al. | 358/128 |
| 4,180,830 | 12/1979 | Roach | 358/128 |
| 4,408,884 | 10/1983 | Kleinknecht et al. | 356/355 |
| 4,454,001 | 6/1984 | Sternheim et al. | 356/355 |
| 4,615,620 | 10/1986 | Noguchi et al. | 356/378 |
| 4,660,979 | 4/1987 | Muething | 356/357 |
| 4,744,660 | 5/1988 | Noguchi et al. | 356/355 |
| 4,964,726 | 10/1990 | Kleinknecht et al. | 356/357 |
| 5,087,121 | 2/1992 | Kakuchi et al. | 356/73 |

FOREIGN PATENT DOCUMENTS

| | | | |
|---|---|---|---|
| 63-85305 | 4/1988 | Japan | G01B 11/22 |
| 251005 | 2/1990 | Japan | G01B 11/22 |

Primary Examiner—James C. Housel
Assistant Examiner—Long V. Le
Attorney, Agent, or Firm—Philip J. Feig; Stephen C. Kaufman

[57] ABSTRACT

An optical measurement system uses a laser beam to measure the depth of high aspect ratio structures disposed in a workpiece. The wavelength of the laser beam is selected so that the workpiece is transparent to the incident radiation and is greater than the lateral dimension of the structure to be measured. The angle of incidence of the laser beam at the workpiece surface or the wavelength of the laser beam is made to vary. The maxima backscatter signals from the top and from the bottom of the structure are detected along with the corresponding angle of incidence or wavelength at such maxima backscatter signals. The depth of the structure is commensurate with the detected angles of incidence or wavelengths at which the maxima backscatter signals are detected. Alternatively, with the angle of incidence and wavelength maintained constant, the maxima backscatter signals are detected as the depth of the structure increases, such as when a high aspect ratio structure is fabricated in a material, in order to measure the depth of the structure during fabrication. An exemplary application of the system is in the measurement of the depth of isolation trenches and trench capacitors in semiconductor materials, such as silicon, used in the fabrication of integrated circuits.

52 Claims, 2 Drawing Sheets

DEPTH MEASUREMENT OF HIGH ASPECT RATIO STRUCTURES

This application is a continuation in part of application Ser. No. 07/882,386, filed May 13, 1992, now abandon.

BACKGROUND OF THE INVENTION

The present invention relates to optical measurement methods and apparatus and particularly, to optical measurement of the depth of high aspect ratio structures, such as isolation trenches and trench capacitors, in semiconductor material used in the fabrication of integrated circuits.

SUMMARY OF THE INVENTION

The fabrication of integrated circuits is changing from the conventional planar device to a cubical device structure. As a result, the measurement of the depth of high aspect ratio structures is of greater importance in the fabrication of integrated circuits.

In accordance with the present invention, a laser beam transparent to a workpiece such as semiconductor material is used for measuring the depth of narrow deep structures in the semiconductor material used in fabricating integrated circuits. Exemplary applications are the measurements of the depth of isolation structures and trench capacitors in silicon.

The wavelength of the laser beam is selected so that the semiconductor material is transparent to the incident radiation. That is, the light beam penetrates through the semiconductor material. Moreover, the wavelength is also selected to be greater than the lateral dimension of the structure to be measured.

The radiation that penetrates the semiconductor material will be scattered by any discontinuities encountered. In the case of measuring a trench, there is a strong discontinuity at both the top and the bottom of the trench. The discontinuities cause the creation of Huygens wavelets which are spherical in form when the discontinuity is smaller than the wavelength. The Huygens wavelets will interfere in phase and result in a strong backscattered plane wave at certain discrete angles of incidence. The backscattered wave intensity can be detected by focussing the wave through a pin hole onto a photodiode. However, when higher measurement sensitivity is required, which will not be the situation unless the wavelength of the light is much greater than the trench width, a heterodyne system can be used. In such case, single photons can be detected and scattering from atomic size features can, in principle, be observed. See, for example, U.S. Pat. No. 4,947,034 issued to H. Wickramasinghe et al and assigned to the same assignee as the present application.

A principal object of the present invention is therefore, the provision of an optical measurement system for measuring the depth of high aspect ratio structures in semiconductor material.

Another object of the present invention is the provision of an optical depth measurement system utilizing a light source transparent to the material to be measured and having a wavelength greater than the lateral width of the structure to be measured.

A further object of the invention is the provision of an optical system for measuring the dimensions of an isolation trench and trench capacitor in a semiconductor material.

Further and still other objects of the invention will become more clearly apparent when the following description is read in conjunction with the accompanying drawing.

DETAILED DESCRIPTION

Figure 1:
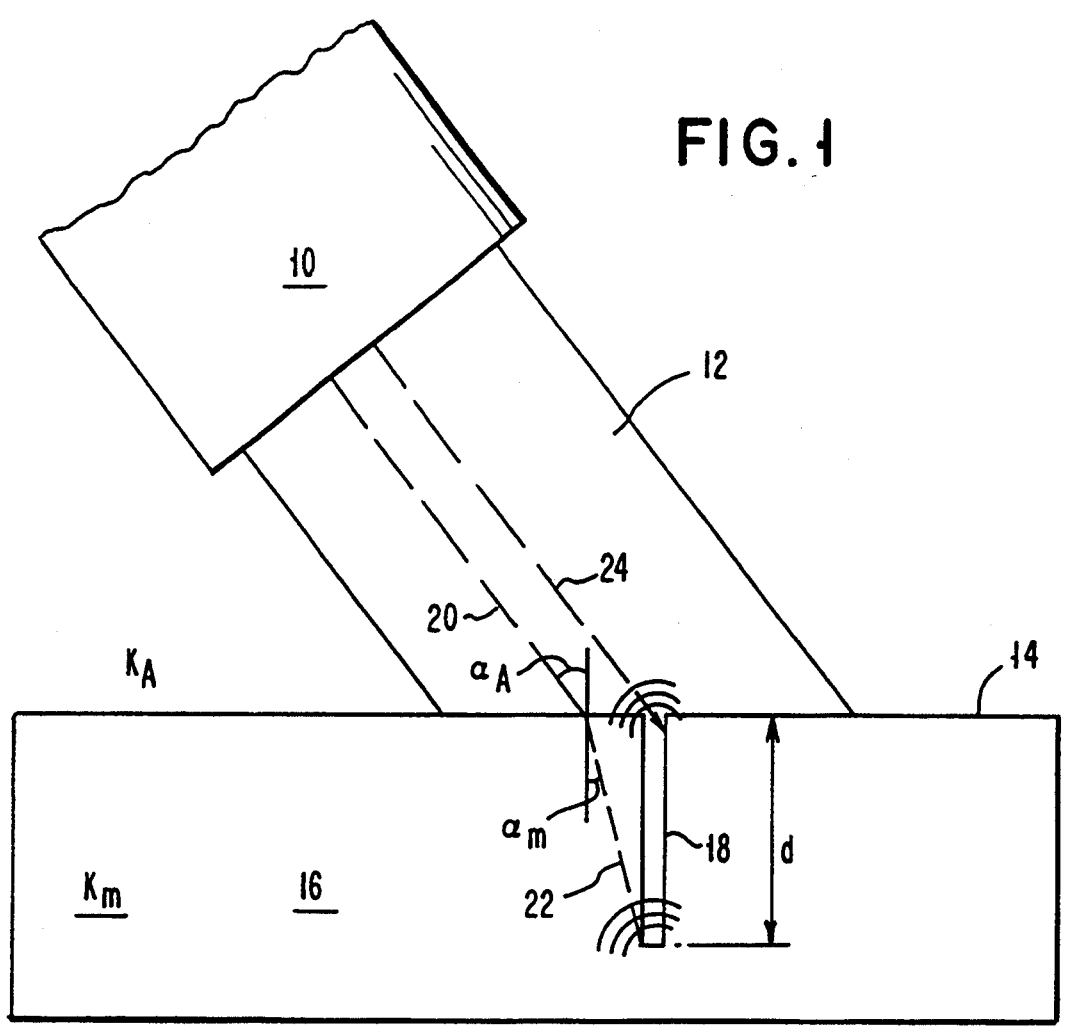
FIG. 1 is a schematic diagram illustrating the broad principle of the present invention.

Referring now to the figures and to FIG. 1 in particular, there is shown a schematic diagram illustrating the basic principle of the test arrangement.

A laser 10 transmits a light beam 12 at an angle of incidence $\alpha_A$ toward the surface 14 of a workpiece 16, such as semiconductor material having a high aspect ratio structure 18 of depth d disposed therein. High aspect ratio structures may be referred to as trenches. Light ray 20 is refracted at the surface 14 of workpiece 16 to propagate within the workpiece 16 as a refracted ray 22 at a refracted angle $\alpha_m$ and is incident at the bottom of the structure 18. Light ray 24 is incident at the top of the structure 18. The propagation constants in air and in the material are $K_A$ and $K_m$, respectively. Then, according to Snell's Law:

$$K_A \sin \alpha_A = K_m \sin \alpha_m \quad (1)$$

$$\sin \alpha_m = \frac{K_A}{K_m} \sin \alpha_A \quad (2)$$

$$\alpha_m = \sin^{-1}\left(\frac{K_A}{K_m} \sin \alpha_A\right) \quad (3)$$

For maximum backscatter, i.e. interference from light scattered at both the top and bottom of the structure 18, $$2dK_m \cos \alpha_m = 2\pi n \quad (4)$$

where $$K_m = \frac{2\pi}{\lambda_m},$$

and $$\cos \alpha_m = \frac{n\lambda_m}{2d} \quad (5)$$

Figure 2:
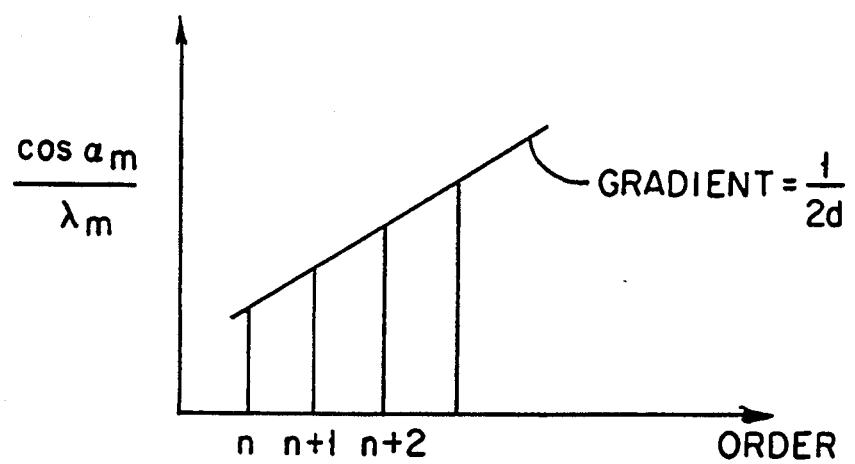
FIG. 2 is a graphical representation of a plot of cos $\alpha_m/\lambda_m$ versus n.

To measure values of $\alpha_m$ for which consecutive maxima in the backscattered waves occur, FIG. 2 shows a graphical representation of cos $\alpha_m/\lambda_m$ versus orders n, n+1, n+2 and so forth. The gradient of the straight line shown in FIG. 2 is $\frac{1}{2}d$, where d is the depth of the structure or trench 18. Therefore, by detecting consecutive maxima backscatter signals and measuring the angle of incidence of the beam for each maxima, the depth of the structure is derived from a single calculation.

It will be apparent to those skilled in the art that from equation 4, it is also possible to maintain the angle of incidence fixed and vary the wavelength $\lambda_m$ to measure values of wavelength $\lambda_m$ for which consecutive maxima in the backscatter occur. Therefore, by detecting consecutive maxima backscatter signals and measuring the wavelength for each maxima, the depth of the structure is derived from a single calculation.

Alternatively, both the angle of incidence and the wavelength can be fixed while the depth d is varied, for example as a trench is being fabricated in a material. In this case, maxima at orders n, n+1, n+2 and so forth occur at depths d in accordance with the calculation per equation 4. By counting consecutive maxima and by interpolating for desired depths between consecutive maxima, it is possible to use the present invention to measure the depth of a structure with both the angle of incidence and the wavelength fixed at respective predetermined values.

Figure 3:
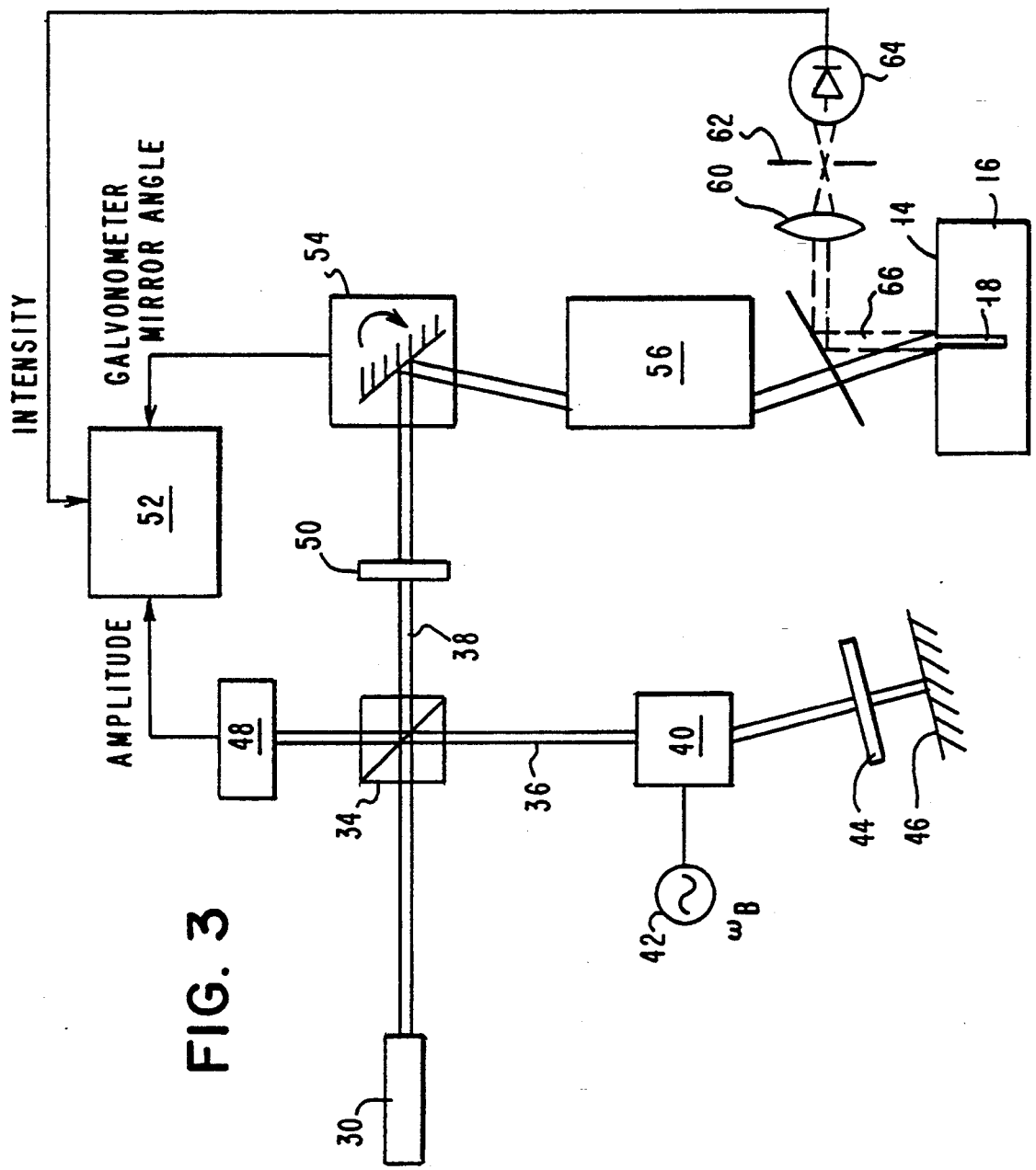
FIG. 3 is a schematic representation of a preferred embodiment of the present invention.

Having described the basic principle of the present invention, in FIG. 3 there is shown a schematic representation of a preferred embodiment of the present invention.

A laser 30 transmits a linearly polarized laser beam 32 to a polarizing beam splitter cube 34 where the plane of polarization of the beam is disposed at 45 degrees to the axis of the beam splitter cube 34. The beam splitter cube 34 splits the incident beam 32 into two beams 36, 38.

A reference beam 36 is incident on a Bragg cell 40 where the frequency of the beam 36 is shifted by the Bragg frequency $\omega_B$ as determined by oscillator 42. After traversing the Bragg cell, the beam travels through a quarter wave plate 44 to a retro-reflecting mirror 46.

After being reflected at mirror 46, the beam travels back through the quarter-wave plate 44 where the polarization of the beam is rotated through 90 degrees. While traveling through the Bragg cell 40 a second time, the optical frequency is shifted again by the Bragg frequency. A portion of the beam exiting the Bragg cell passes through beam splitter cube 34 to a detector 48, such as a polarizer/photodiode/lock-in amplifier combination. The beam 38 exiting the beam splitter cube 34 is transmitted through a Faraday rotator 50 where the beam polarization is rotated by 45 degrees and than directed on the axis of a rotating galvanometer mirror 54. The rotation angle of the galvanometer mirror 54 determines the angle of incidence $\alpha_A$ of the light beam on the surface 14 of the workpiece 16 and the angle of refraction $\alpha_m$ of the light beam traveling through the workpiece 16.

A 1:1 telescope 56 is placed at a distance equal to its focal length from the mirror 54. As a result, an image of the spot on mirror 54 is projected via pellicle beamsplitter 58 onto the surface 14 of the workpiece 16 when the workpiece is disposed at a distance from the telescope 56 equal to the focal length of the telescope.

The backscattered light from the surface 14 travels back through the same path as the incident beam, including traveling through the Faraday rotator 50 where the polarization rotates by an additional 45 degrees. The beam after traveling through the Faraday rotator 50, is reflected at the polarization beam splitter cube 34 and travels colinearly with the reference beam to the detector 48.

The amplitude of the beat signal having a frequency equal to twice the Bragg frequency received at the polarizer/photodiode/lock-in amplifier combination 48 is proportional to the amplitude of the backscatter beam arising from structures 18 in the workpiece 16. In most applications, the magnitude of the backscatter responsive signal will be much less than the magnitude of the beam 38 and the voltage measured by the detector 48 will be directly proportional to the amplitude of the backscattered beam from workpiece 16.

In performing the depth measurement, as mirror 54 rotates a laser beam scans at varying incident angles on the surface 14 of the workpiece 16 concurrently with the polarizer/photodetector/lock-in amplifier combination 48 measuring the amplitude of the backscatter signal from the surface 14, both of which signals are recorded by a computer 52. Upon encountering a discontinuity in the workpiece, such as structure 18, a relative maximum backscatter signal is detected by the detector 48 at discrete incident angles. A maximum signal is detected at incident angles of the beam 12 where there is constructive interference from backscattered ray 24 from the top of structure 18 and from the ray 22 transmitted through workpiece 16 and backscattered from the bottom of the structure 18. The computer 52 correlates a maximum amplitude from detector 48 with the corresponding angle of galvanometer mirror 54. A curve of the form shown in FIG. 2 is generated. The slope of the curve is inversely proportional to the depth of the structure 18.

Instead of detecting the backscatter signal using the polarizer/photodiode/lock-in amplifier combination, in an alternative embodiment, scattered waves 66 that propagate in a direction perpendicular to the surface 14 are partially reflected by pellicle beam splitter 58 and focussed by a lens 60 through a pin-hole 62 onto a photodiode 64. In this alternative embodiment the intensity of the scattered wave detected at photodiode 64 is recorded by the computer 52 along with the corresponding angle of mirror 54. In the alternative embodiment the condition for maximum backscatter interference is slightly modified from that stated in equation (5) supra. The maximum backscatter in the alternative embodiment occurs according to the following equation $$\cos \alpha_m = \frac{n\lambda_m}{d} - 1 \qquad (6)$$

Since the predetermined wavelength of the laser beam is known, correlation of the angle of incidence and hence, the angle of refraction of the beam within the material 16, with the consecutive maxima backscattered signals results in a linear relationship of the form shown in FIG. 2. Calculation of the gradient or slope of the curve by computer 52 provides a value inversely proportional to the depth d of the structure 18.

The present invention therefore provides a simple method and apparatus for measuring the depth of high aspect ratio structures, such as isolation trenches or capacitive trenches, in semiconductor materials used in the fabrication of integrated circuits.

When the semiconductor material 16 is silicon, for example, the wavelength of the laser beam can be 1.3 microns in order to penetrate the silicon. The wavelength inside the silicon will be 0.37 microns which is longer than the typical width of a trench, i.e. approximately 0.25 micron. Such an arrangement permits the depth of a trench to be measured using either of the above described techniques.

While silicon is a preferred semiconductor material to be measured, other materials used in the fabrication of integrated circuits such as silicon nitride and silicon dioxide are also capable of being measured using the present invention.

The laser may be a solid state, gas, or YAG laser or the like capable of transmitting laser beams having a wavelength in the range between approximately 0.6328 microns and 1.3 microns.

While the invention has been described in conjunction with the measurement of a single structure in a semiconductor material used in the fabrication of integrated circuits, the same method and apparatus are equally applicable to the testing of a workpiece containing multiple such structures.

While there has been described and illustrated several embodiments of the present invention, it will be apparent to those skilled in the art that further modifications and variations are possible without deviating from the broad principle of the present invention which shall be limited solely by the scope of the claims appended hereto.

What is claimed is:

1. A method of optically measuring the depth of a trench structure in a workpiece comprising the steps of:
    scanning a surface of a workpiece containing a trench structure with an energy beam, said structure having a top and a bottom and being of a predetermined width, said energy beam having a wavelength at which the workpiece is transparent and which wavelength is greater than said predetermined width, said beam being incident at said surface at angles $\alpha_A$ with respect to said surface;
    detecting backscatter signals reflected from the top and from the bottom of said structure; and
    determining at which angles $\alpha_A$ maxima backscatter signals are detected, whereby the depth of said structure is commensurate with the angles $\alpha_A$ at which said maxima backscatter signals are detected.

2. A method as set forth in claim 1 wherein said scanning comprises reflecting said energy beam from a galvanometer mirror.

3. A method as set forth in claim 1 wherein said detecting backscatter signals comprises detecting amplitude of backscatter interference signals.

4. A method as set forth in claim 1 wherein said energy beam is a laser beam.

5. A method as set forth in claim 1 wherein said structure is an isolation trench.

6. A method as set forth in claim 1 wherein said structure is a trench capacitor.

7. A method as set forth in claim 1, wherein said workpiece comprises semiconductor material.

8. A method as set forth in claim 1 wherein said workpiece is selected from the group consisting of silicon, silicon nitride and silicon dioxide.

9. A method as set forth in claim 7 wherein said structure is an isolation trench.

10. A method as set forth in claim 7 wherein said structure is a trench capacitor.

11. An optical apparatus for measuring the depth of a trench structure in a workpiece comprising:
    means for transmitting an energy beam at a surface of a workpiece containing a trench structure, said structure having a top and a bottom and being of a predetermined width, said energy beam having a wavelength at which the workpiece is transparent and which wavelength is greater than said predetermined width;
    scanning means for causing said beam to be incident at angles $\alpha_A$ with respect to said surface;
    detector means for detecting backscatter signals from the top and from the bottom of said structure; and
    means for determining at which angles $\alpha_A$ maxima backscatter signals are detected by said detector means, whereby the depth of said structure is commensurate with the angles $\alpha_A$ at which said maxima backscatter signals are detected.

12. An optical apparatus as set forth in claim 11 wherein said means for transmitting an energy beam comprises a laser.

13. An optical apparatus as set forth in claim 11 wherein said scanning means comprises a galvanometer mirror.

14. An optical apparatus as set forth in claim 11 wherein said detector means comprises a polarizer/photodetector/lock-in amplifier combination.

15. An optical apparatus as set forth in claim 11 wherein said detector means comprises a reflector, a lens, a pin hole and a photodetector.

16. An optical apparatus as set forth in claim 11 wherein said means for determining comprises a computer.

17. An optical apparatus as set forth in claim 11 wherein said workpiece comprises semiconductor material.

18. An optical apparatus as set forth in claim 11 wherein said workpiece is selected from the group consisting of silicon, silicon nitride and silicon dioxide.

19. An optical apparatus as set forth in claim 17 wherein said structure is a trench capacitor.

20. An optical apparatus as set forth in claim 17 wherein said structure is an isolation trench.

21. A method of optically measuring the depth of a trench structure in a workpiece comprising the steps of:
    scanning a surface of a workpiece containing a trench structure with an energy beam, said structure having a top and a bottom and being of a predetermined width, said energy beam having wavelengths $\lambda_M$ at which the workpiece is transparent and which wavelengths $\lambda_M$ are greater than said predetermined width, said beam being incident at said surface at an angle $\alpha_A$ with respect to said surface;
    detecting backscatter signals reflected from the top and from the bottom of said structure; and
    determining at which wavelengths $\lambda_M$ maxima backscatter signals are detected, whereby the depth of said structure is commensurate with the wavelengths $\lambda_M$ at which said maxima backscatter signals are detected.

22. A method as set forth in claim 21, wherein said detecting backscatter signals comprises detecting an amplitude of backscatter interference signals.

23. A method as set forth in claim 21, wherein said energy beam is a laser beam.

24. A method as set forth in claim 21, wherein said structure is an isolation trench.

25. A method as set forth in claim 21, wherein said structure is a trench capacitor.

26. A method as set forth in claim 21, wherein said workpiece comprises semiconductor material.

27. A method as set forth in claim 21, wherein said workpiece is selected from the group consisting of silicon, silicon nitride and silicon dioxide.

28. An optical apparatus for measuring the depth of a trench structure in a workpiece comprising:
    means for transmitting an energy beam at a surface of a workpiece containing a trench structure, said structure having a top and a bottom and being of a predetermined width, said energy beam having wavelengths $\lambda_M$ at which the workpiece is transparent and which wavelengths $\lambda_M$ are greater than said predetermined width;

means for causing said beam to be incident at an angle $\alpha_A$ with respect to said surface;

detector means for detecting backscatter signals from the top and from the bottom of said structure; and means for determining at which wavelengths $\lambda_M$ maxima backscatter signals are detected by said detector means, whereby the depth of said structure is commensurate with the wavelengths $\lambda_M$ at which said maxima backscatter signals are detected.

29. An optical apparatus as set forth in claim 28, wherein said means for transmitting an energy beam comprises a laser.

30. An optical apparatus as set forth in claim 28, wherein said detector means comprises a polarizer/photodetector/lock-in amplifier combination.

31. An optical apparatus as set forth in claim 28, wherein said detector means comprises a reflector, a lens, a pin hole and a photodetector.

32. An optical apparatus as set forth in claim 28, wherein said means for determining comprises a computer.

33. An optical apparatus as set forth in claim 28, wherein said workpiece comprises semiconductor material.

34. An optical apparatus as set forth in claim 28, wherein said workpiece is selected from the group consisting of silicon, silicon nitride and silicon dioxide.

35. An optical apparatus as set forth in claim 33, wherein said structure is a trench capacitor.

36. An optical apparatus as set forth in claim 33, wherein said structure is an isolation trench.

37. A method of optically measuring the depth of a trench structure in a workpiece comprising the steps of:

scanning a surface of a workpiece containing a trench structure with an energy beam, said structure having a top and a bottom and being of a predetermined width, said energy beam having a wavelength at which the workpiece is transparent and which wavelength is greater than said predetermined width, said beam being incident at said surface at an angle $\alpha_A$ with respect to said surface;

detecting backscatter signals reflected from the top and from the bottom of said structure as the depth of said structure varies; and determining when maxima backscatter signals are detected, whereby the depth of said structure is commensurate with the detecting of said maxima backscatter signals.

38. A method as set forth in claim 37, wherein said detecting backscatter signals comprises detecting an amplitude of backscatter interference signals.

39. A method as set forth in claim 37, wherein said energy beam is a laser beam.

40. A method as set forth in claim 37, wherein said structure is an isolation trench.

41. A method as set forth in claim 37, wherein said structure is a trench capacitor.

42. A method as set forth in claim 37, wherein said workpiece comprises semiconductor material.

43. A method as set forth in claim 37, wherein said workpiece is selected from the group consisting of silicon, silicon nitride and silicon dioxide.

44. An optical apparatus for measuring the depth of a trench structure in a workpiece comprising:

means for transmitting an energy beam at a surface of a workpiece containing a trench structure, said structure having a top and a bottom and being of predetermined width, said energy beam having a wavelength at which the workpiece is transparent and which wavelength is greater than said predetermined width;

means for causing said beam to be incident at an angle $\alpha_A$ with respect to said surface;

detector means for detecting backscatter signals from the top and from the bottom of said structure as the depth of said structure varies; and means for determining when maxima backscatter signals are detected by said detector means, whereby the depth of said structure is commensurate with detection of said maxima backscatter signals.

45. An optical apparatus as set forth in claim 44, wherein said means for transmitting an energy beam comprises a laser.

46. An optical apparatus as set forth in claim 44, wherein said detector means comprises a polarizer/photodetector/lock-in amplifier combination.

47. An optical apparatus as set forth in claim 44, wherein said detector means comprises a reflector, a lens, a pin hole and a photodetector.

48. An optical apparatus as set forth in claim 44, wherein said means for determining comprises a computer.

49. An optical apparatus as set forth in claim 44, wherein said workpiece comprises semiconductor material.

50. An optical apparatus as set forth in claim 44, wherein said workpiece is selected from the group consisting of silicon, silicon nitride and silicon dioxide.

51. An optical apparatus as set forth in claim 49, wherein said structure is a trench capacitor.

52. An optical apparatus as set forth in claim 49, wherein said structure is an isolation trench.

* * * * *